United States Patent [19]
Palmaer

[11] Patent Number: 6,079,543
[45] Date of Patent: Jun. 27, 2000

[54] LANE-DIVIDED PLASTIC CONVEYOR BELT

[75] Inventor: Eric K. Palmaer, Granite Bay, Calif.

[73] Assignee: KVP Falcon Plastic Belting, Inc., Rancho Cordova, Calif.

[21] Appl. No.: 09/099,912

[22] Filed: Jun. 18, 1998

[51] Int. Cl.⁷ ................................. B65G 47/12
[52] U.S. Cl. ................. 198/445; 198/699.1; 198/853
[58] Field of Search .................. 198/445, 446, 198/690.2, 699.1, 852, 853, 822

[56] References Cited

U.S. PATENT DOCUMENTS

| | | | |
|---|---|---|---|
| 559,370 | 5/1896 | Dodge | 198/822 |
| 3,800,937 | 4/1974 | Tassie | 198/853 |
| 4,194,300 | 3/1980 | Swanson et al. | 198/822 |
| 4,213,527 | 7/1980 | Lapeyre et al. | 198/853 |
| 4,925,013 | 5/1990 | Lapeyre | 198/699.1 |
| 4,993,543 | 2/1991 | Lapeyre | 198/853 |
| 5,101,966 | 4/1992 | Lapeyre . | |
| 5,181,601 | 1/1993 | Palmaer et al. . | |
| 5,392,698 | 2/1995 | Sprecher et al. | 198/699.1 |
| 5,413,211 | 5/1995 | Faulkner | 198/690.2 |
| 5,706,934 | 1/1998 | Palmaer et al. . | |

OTHER PUBLICATIONS

Falcon Belting Products Catalog, 2 pp. on "Series 40 Belting Accessories".

*Primary Examiner*—Jospeh E. Valenza
*Attorney, Agent, or Firm*—Thomas M. Freiburger

[57] ABSTRACT

A modular plastic conveyor belt is formed of interconnected modules having upper sides which divide the belt into longitudinal or transverse lane;, for conveying items which are either generally elongated so as to fit lengthwise in the lanes, or are generally round or otherwise adapted for lying together in extended rows, for aid in inspection, sorting or packaging. Ridges between lanes may support items for cooling, such as cooked foods. Formed as parallel troughs, the lanes in one embodiment are defined by the upper surfaces of forward and rearward link ends and of a transverse connecting section of the modules. Two specific embodiments have lanes defined on top of a solid platform belt, one with longitudinal lanes and one with transverse lanes.

15 Claims, 10 Drawing Sheets

LANE-DIVIDED PLASTIC CONVEYOR BELT

BACKGROUND OF THE INVENTION

This invention concerns modular plastic conveyor belts, and more specifically the invention encompasses such conveyor belts divided into longitudinally extending lanes, as for organization of conveyed items by orientation or simply by lanes to aid in inspection, sorting or packing, or for cooling of items which lie on ridges dividing the lanes.

Lane-divided conveyor belts are known, including in the to modular plastic belt field. Prior belts have been divided into transverse product carrying channels as well as into longitudinal lanes. As one example, Falcon Belting produces CC40 series belts, with accessories, to provide for transverse channels and/or longitudinal channels. The longitudinal channels are provided on what is essentially a solid top belt, with intermittent studs (extending upwardly. The transverse channels are formed by "cleats" integral with solid top belt modules; the cleats are not continuous laterally.

As another example, Intralox markets a Series 600 multilane belt which is essentially a flat topped open belt formed of spaced longitudinally extending members, but with series of hollow top segments on the top surface of the belt, in a series of parallel longitudinal rows, forming lane dividing ridges. The link ends themselves of the belt modules do not contribute to the shape of the longitudinal lanes. See U.S. Pat. No. 5,101,966 showing a form of this belt.

Lane-divided belts are used for a variety of different purposes and in several different industries. Virtually anything can be delivered off the end of a lane-divided belt into a desired orientation in packaging which is properly positioned at the end of the belt run. Lane-divided belts are sometimes used with automatic inspection equipment, with automatic ejection (as by air jets) of non-conforming inspected pieces at the end of a belt run. Lane-divided belts can orient elongated articles into a desired longitudinal orientation when the items are dropped onto the belt by automated equipment. They can also be used for cooling items conveyed on the tops of the lane-dividing ridges.

It is among the objects of the invention described below to provide simplified, improved lane-divided modular plastic conveyor belts, for longitudinal or transverse lanes or channels, wherein the structure forming the shape of the lanes or troughs actually overlaps from module to module, with essentially continuous ridges between adjacent lanes.

SUMMARY OF THE INVENTION

The present invention is a lane-divided modular plastic conveyor belt, with an upper side of the belt divided into longitudinally extending lanes for arranging and conveying items in orderly longitudinal rows, and in one embodiment, into transversely extending lanes. Each nodule of the plastic conveyor belt includes a series of spaced forward link ends or projections, each having a transverse rod opening aligned with similar transverse openings of other forward projections, to receive a connecting rod for securing the module to an adjacent module, in the manner of many typical modular plastic conveyor belts. Also as in previous belts of this general type, each module has a series of spaced rearward link ends or projections, laterally offset from the forward projections of the module and having aligned transverse openings for receiving a connecting rod to secure these projections with forward projections of a succeeding module in interdigited relationship.

In some preferred embodiments each module has a transverse bar or platform or connecting section between and integrally connected to the forward and rearward projections. The upper side of each module is formed into a series of parallel lanes oriented longitudinally, each lane being generally in the shape of a trough, with a ridge as a highest feature dividing adjacent lanes. The forward projections or link ends each have an upper surface forming a portion of the trough-shaped lane. Each ridge which divides adjacent lanes is formed by the top of a rearward projection, which also forms wall portions of the trough shaped lane just below the ridge. By this configuration of the modules, when succeeding modules are interdigited, the forward projections interdigit with the rearward projections of succeeding modules to complete the trough-shaped lanes extending from module to module.

In preferred embodiments the ridges of the rearward projections in the assembled belt are closely adjacent from module to module successively, in the longitudinal direction, with gaps between successive ridges being no greater than about one millimeter in length (in a ½ inch or one-inch pitch belt), forming essentially continuous lane dividers.

In one preferred embodiment the trough-shaped lanes are generally shaped as a portion of a cylinder. The ridges may be narrow between lanes; preferably flat ridge tops, which could support small items and discourage such items from falling into the lanes, are avoided.

Preferably the modules are integrally molded of solid plastic material, so that each projection comprises solid material from the upper side to the bottom side of the module, departing from constructions used in many lane divided belts of the prior art. In one preferred embodiment the trough-shaped lanes are generally U-shaped, each with a concave bottom and concave walls, with the forward projections having concave upper surfaces and the rearward projections having concave and inclined upper surfaces except at the ridge which is formed by the rearward projections. Other cross sections may be used in the lanes if desired.

In another embodiment of the invention, the belt modules are solid-top modules which are driven by sprockets against the barrels of the link ends, where the modules are interdigited. As in the other embodiments, the solid-top module has divided lanes, which may be similar in shape to those described above. The lanes in one embodiment extend longitudinally relative to belt travel, generally from front to back of the solid top module, with the lane-dividing ridges placed at the tops of the link ends. Since the link ends are staggered at front and rear sides of the module, each ridge ends at the base of the link ends on the opposite side of the module. In the assembled belt the modules overlap to form substantially continuous ridges and troughs, useful for purposes as described above and further to contain relatively small objects or pieces from falling from the belt.

The lane widths, and the number of lanes formed by a module, can vary. In some embodiments described herein the trough-shaped lanes are relatively narrow, and the width of each lane may be equal to the lateral sparing between adjacent rearward projections in the module. In other embodiments the width of each trough-shaped lane is greater than the spacing between adjacent rearward projections in the module, with each lane being comprised of at least two forward projections in a module and sometimes more.

As in other plastic conveyor modules of the assignee of this invention, the modules may be adapted for use in building belts of various widths, with more than one module side by side in each transverse row of modules. The successive rows of modules can thus be staggered so that joints between adjacent side-by-side modules in one row are offset in position from joints of preceding and succeeding rows. At joints between side-by-side modules, the modules can have half-width rearward projections, so that when held together side-by-side by a connecting rod, two adjacent half-width rearward projections butt laterally together to form generally the width of a regular rearward projection which occurs between edges of a module. This is one example; other systems for side-by-side continuity of modules can be used.

Solid top modules of this invention can be formed with transverse rather than longitudinal lanes. In this form the modules are solid plastic and have a lateral ridge through each module, with the base of the trough formed where link ends interconnect.

Belts formed according to one preferred embodiment of the invention are driven by sprocket teeth engaging against a transverse bar, behind the forward projections (they can also be driven in the reverse direction). The tooth extends into a space between the transverse bar and the forward end of a forward projection of the next module back. In the solid top embodiments the belts preferably are driven against the link ends.

Accordingly, it is an object of the invention to efficiently receive and convey articles which are desired to be arranged in an oriented, elongated fashion or in orderly rows, or to provide for cooling of cooked food products, with a lane-divided belt formed of modules in which the forward and rearward link ends of the modules have upper surfaces which actually form the trough-shaped lanes. These and other objects, advantages and features of the invention will be apparent from the following description of preferred embodiments, considered along with the accompanying drawings.

DESCRIPTION OF PREFERRED EMBODIMENTS

Figure 1:
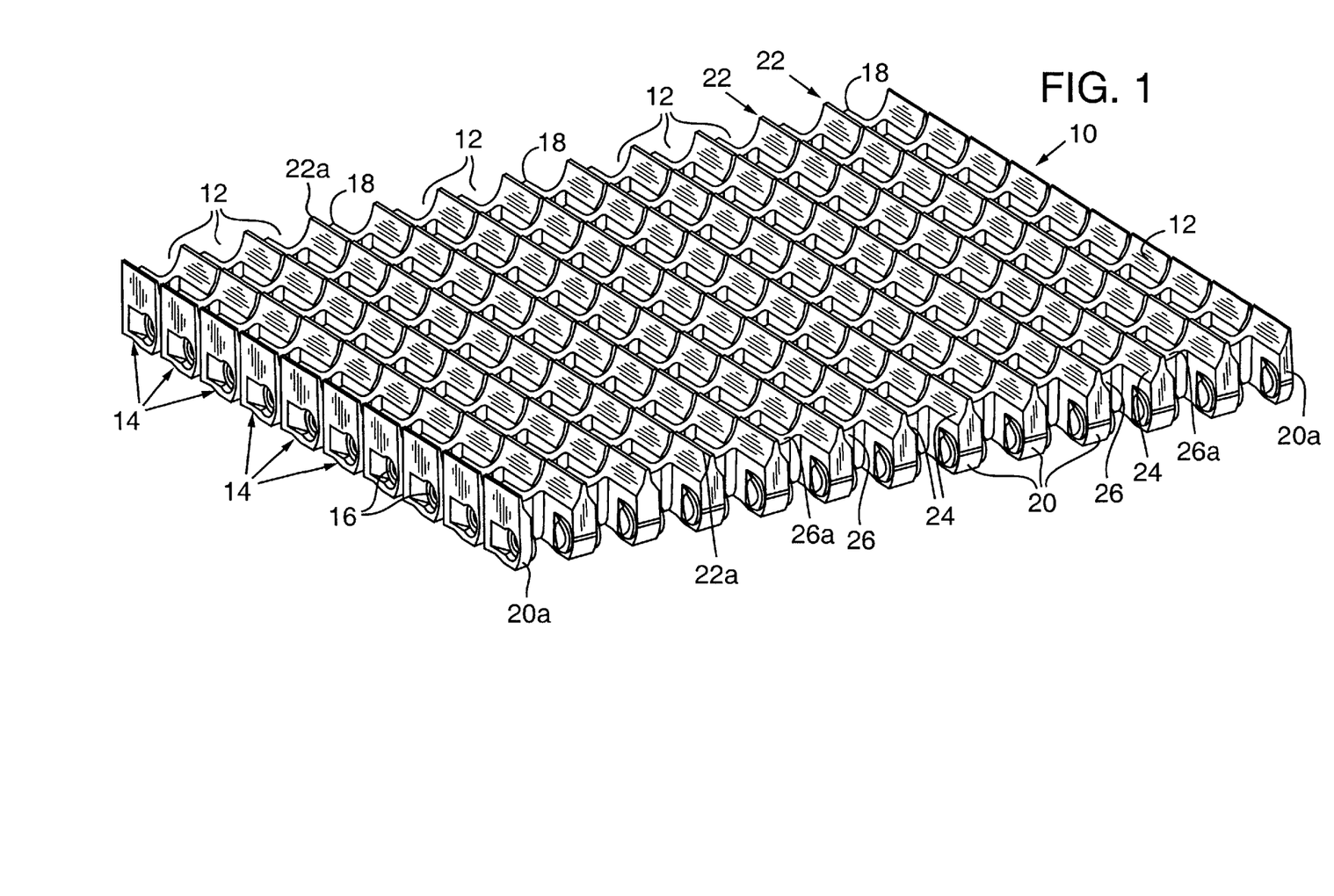
FIG. 1 is a perspective view of a lane-divided plastic conveyor belt with relatively narrow lanes, in accordance with one embodiment of the invention.

In the drawings, FIG. 1 shows a portion of a lane-divided modular plastic conveyor belt 10 having a series of parallel, longitudinally oriented trough-shaped lanes 12 in accordance with the invention. In the example shown in FIG. 1, the belt portion is formed by a series of successive modules 14, each module in the assembled belt being interdigited with a module to the front and with a succeeding module, connected by connecting rods 16. The perspective view of FIG. 1 shows a portion of the forward projections 18 of the module, and shows more clearly the modules' rearward projections 20, with half-width rearward projections 20a being at the side edges of each module. As in other plastic belt modules produced by KVP Systems, Inc., the modules may have these half-width edge link ends or projections 20a at edges, so that they are adapted to be abutted side by side with half-width link ends of adjacent modules in forming a wider belt. The two abutted projections 20a together form essentially the same shape and width as a normal rearward link end 20. However, these half-width link ends are not essential to the invention and other forms of edge transition can be provided. In such a belt made up of several modules to a row, the joints between modules from row to row preferably are staggered so as to interlock succeeding rows, as is well known in modular belts. The modules can vary in width.

The terms "forward" and "rearward", as applied to the link ends and to the orientation of the module or belt itself, are merely for illustrative purposes in reference to the drawings, and are not intended to limit the belt or its orientation. The belt in preferred embodiments can be driven in either direction, so that the rearward projections 20 would then actually serve as forward projections. Thus, these terms should not be taken as limiting.

As FIG. 1 shows, the trough-shaped lanes 12 in this embodiment are only as wide as the spacing between adjacent rearward link ends 20, with only a single forward projection 18 within and helping form each lane 12. The lanes are divided by ridges 22, formed by successive rearward projections 20 of successive modules. The rearward projections each have an upwardly extending ridge 22a which has a longitudinal dimension such as to be closely spaced to the next rearward projections, both forward and rear, so as to form a substantially continuous lane-dividing ridge 22. In one preferred embodiment the separation between serially adjacent rearward projection ridges 22a in an assembled belt of ½ inch (13 mm) pitch (longitudinally module to module) is no more than about 1 millimeter, or about 1.5 millimeter under belt tension. However, this gap can vary, the important consideration being that the gap is small compared to the items being conveyed. The gap can be as large as desired provided the products to be conveyed are unable or very unlikely to enter the gap when the products are placed on the conveyor or while they are conveyed.

One embodiment of such a ½ inch pitch belt as referenced above has 12 lanes in a module 14 such as shown in FIG. 1, with a width of about 6 inches (152 mm), so that lanes are about ½ inch wide (13 mm). These are merely examples, and many other configurations, sizes and spacings of lane-divided belts according to the invention can be produced.

FIG. 1 also shows that the lanes 12, in one preferred embodiment, are each generally U-shaped in cross section, and this shape may be a portion of a cylinder. See also FIGS. 3 and 4. The lanes could alternatively be V-shaped or trapezoidal trough-shaped. Particular configurations are well suited to specific product configurations. The narrow ridges 22a of each module, in a ½ inch pitch module of the size described above, may be about 1 millimeter wide at the top of the ridge, with the rearward projection then sloping laterally down in a concave surface 24 to form a portion of the trough-shaped lane. However, this again may vary, depending on the shape of items being conveyed. A narrow ridge allows for wider usable width of lanes, and provides a narrower line of contact with cooked items to be cooled by resting on the ridge tops; but wider ridges, somewhat rounded at top, are also effective in helping items placed on the conveyor to drop into and become oriented in the lanes. A transverse bar 26, near the middle of the module, connects the forward and rearward projections in each module, this transverse bar 26 being partially seen in FIG. 1, better seen in FIG. 2. The bar 26 has a concave U-shaped upper surface 26a in preferred embodiments, and this region forms the bottom portion of the trough-shaped lane.

Figure 2:
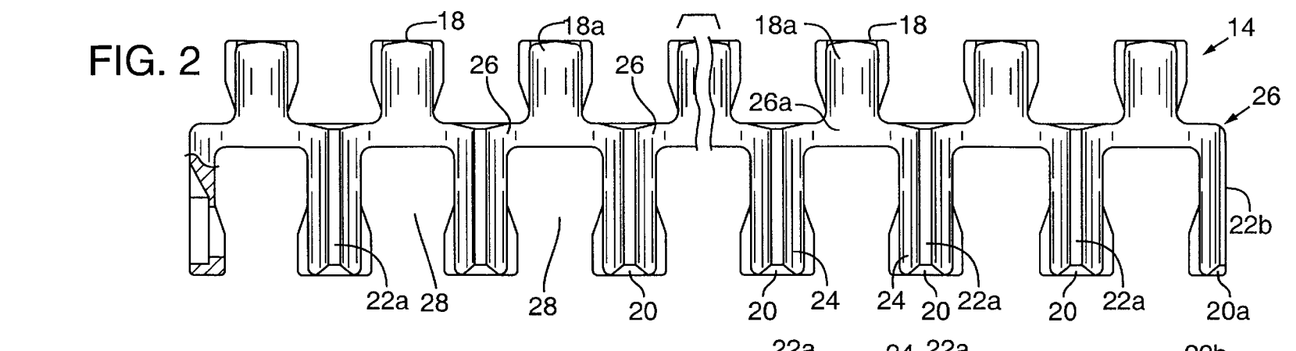
FIG. 2 is a top plan view showing a module forming the belt of FIG. 1.
Figure 5:
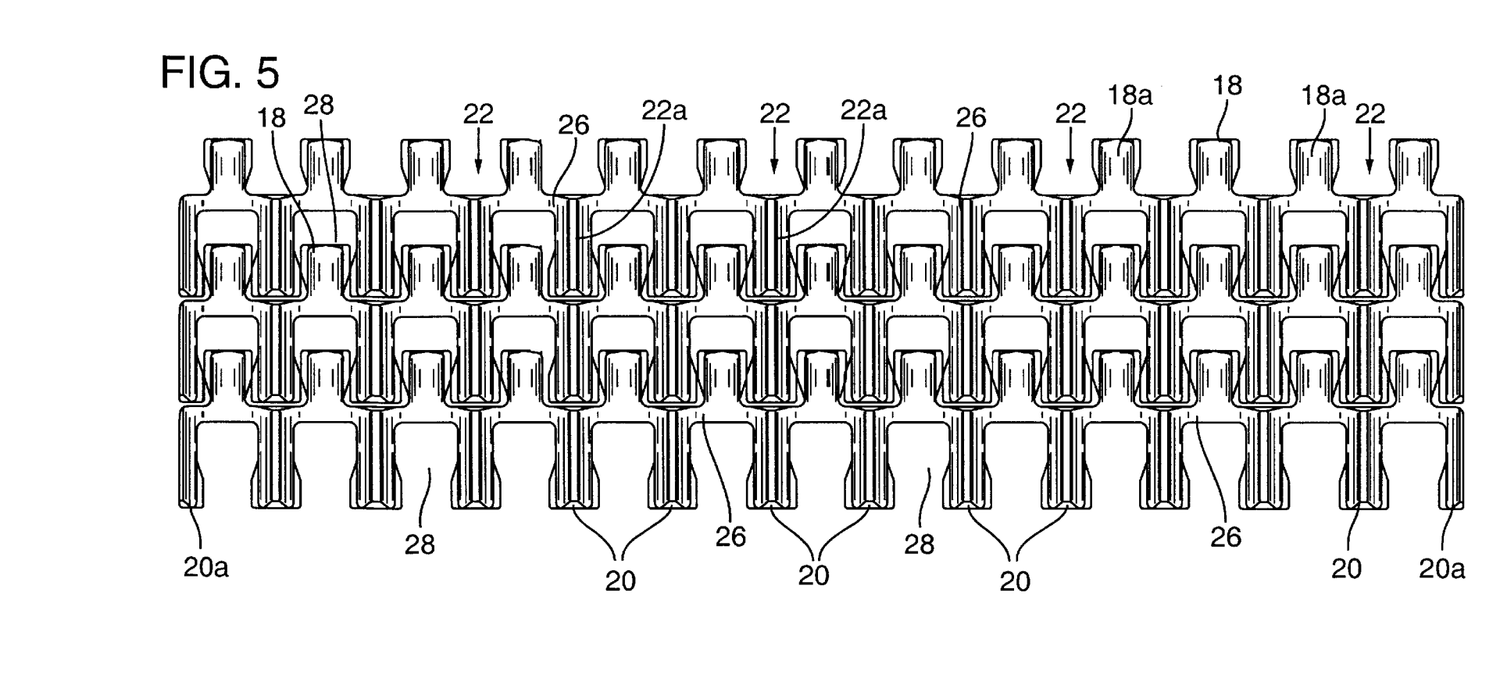
FIG. 5 is a plan view showing several of the modules connected together.

FIG. 2 shows a module 14 in plan view, shown broken with a portion of the width of the module removed, and partially in section at the left end. The rearward projections 20 are shown with their ridges 22a, each of which lines up in the assembled belt with a series of succeeding rearward projections to form the continuous lane dividing ridges 22 shown in FIG. 1. Also, FIG. 2 shows the forward projections 18, each of which in this preferred embodiment has a concave upper surface 18a, merging with the concave upper surface 26a of the transverse bar 26 which extends through the width of the module arid integrally connects with both the forward projections 18 and the rear projections 20. As can be seen in this plan view, in this embodiment a continuous concave, U-shaped or trough-shaped surface is formed widthwise from just below a rear projection ridge 22a (the concave area 24) down across the center bar 26 and across the forward projection upper surface 18a, continuing back up the concave center bar surface 26a and into the concave portion 24 of the next adjacent rear projection 20. When a succeeding module is interdigited with the module 14 of FIG. 2 (as shown in FIG. 5), a forward projection fills the yoke-shaped recess 28 formed between adjacent rear projections 20 and by the center bar 26, thereby providing further concave bottom structure for the trough-shaped lane. Thus, each lane is formed by the overlapping forward 18 and rear 20 projections themselves, along with the relatively narrow transverse bar 26, not requiring any added-on or secondarily molded top surface structure to form the divisions and lanes.

Other cross sections of lanes can be applied, such as trapezoidal sections, narrower at bottom than top, V-shaped sections or essentially rectangular sections, with the interdigited modules still cooperating to define each lane.

Figure 3:
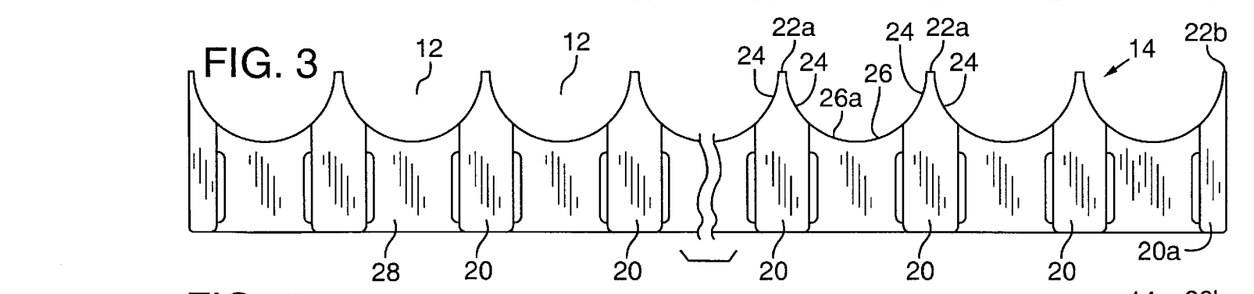
FIG. 3 is an elevation view showing a module as in FIG. 2, looking in the longitudinal direction of the belt.
Figure 4:
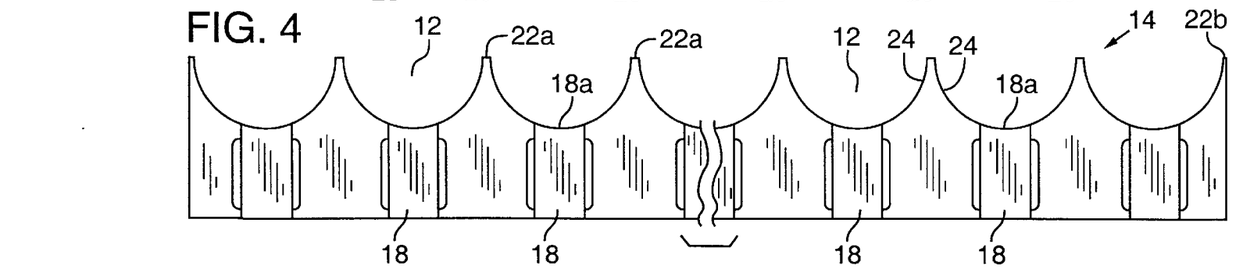
FIG. 4 is an elevation view similar to FIG. 3, but looking in an opposite longitudinal direction relative to the belt.

FIG. 2 also shows that the edge projections 20a, in the case where they are half-width for mating with an adjacent module side by side, have essentially hall:-width rear projection ridges 22b. In FIGS. 2–4 the( ridges 22a and 22b are indicated as flat, but they can be rounded as well.

In FIG. 3 the plastic module 14 is shown in elevation view, looking in the nominally forward direction, at the rear sides of the rearward projections 20 and 20a. Like FIG. 2, FIG. 3 is fragmented, omitting a center portion of the module. The trough-shaped lanes 12 are clearly shown in this view, and are indicated as generally cylindrical in one preferred embodiment. As discussed above, and as can be envisioned clearly from FIGS. 1, 2, 3, 4 and 5, the cylindrical or U-shaped surface from ridge top to ridge top 22a in this embodiment is formed, first, by the side or shoulder area 24 of a rear projection, then by a connecting portion of the transverse bar 26 (with its upper surface 26a), by the upper surface 18a of a forward projection 18, then by the bar 26 and then by the shoulder area 24 of the next adjacent rear projection 20.

FIG. 4 is a view similar to FIG. 3, but looking in the opposite longitudinal direction. FIG. 4 reveals the forward projections 18 from the nominally front or forward side, these projections being midway between ridges 22a of the rear projections, in this preferred embodiment in which a lane is defined with a width equal to a single spacing from rear projection to adjacent rear projection.

Figure 6:
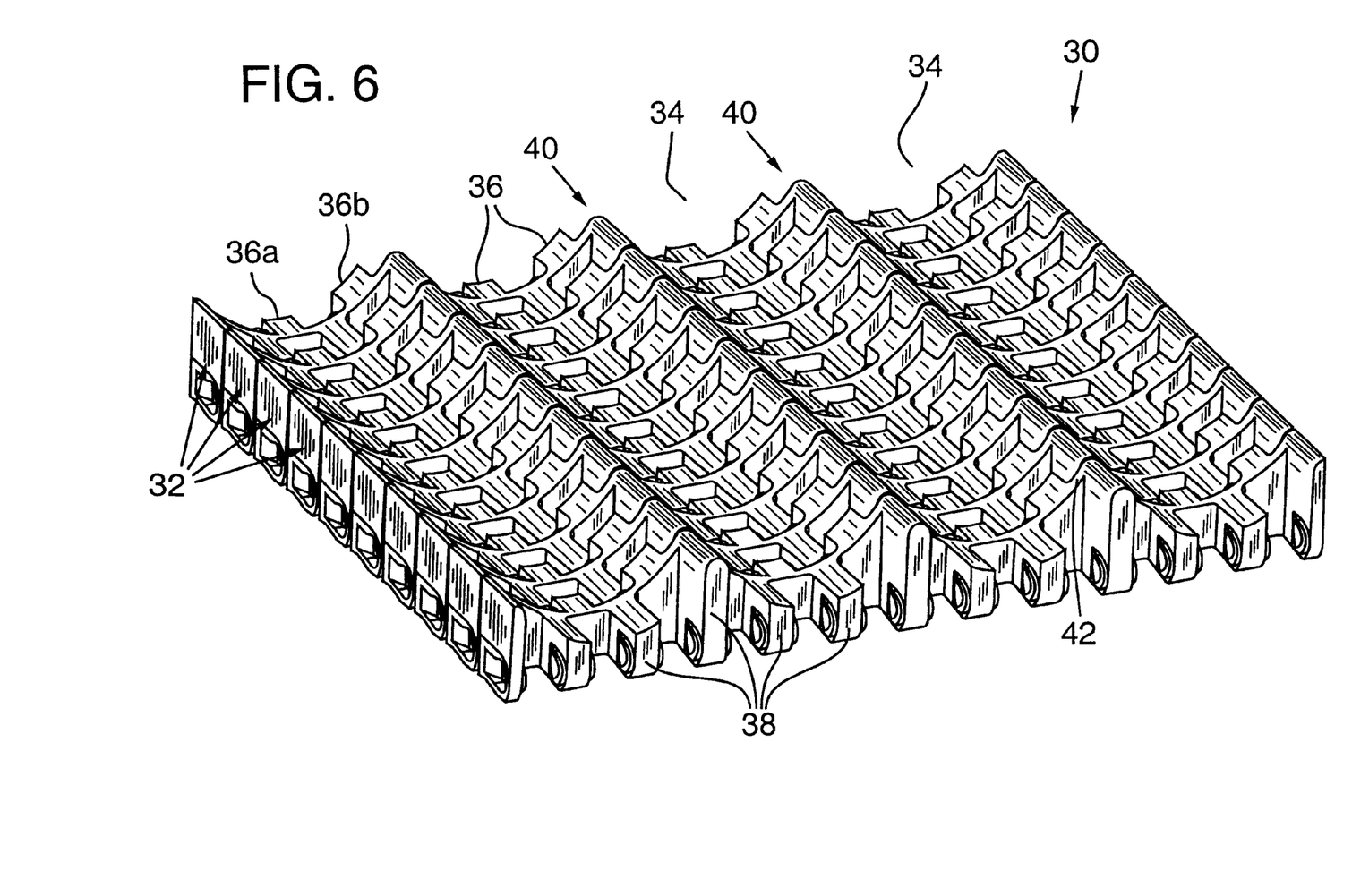
FIG. 6 is a perspective view showing another embodiment of a lane-divided belt formed according to the invention.

The perspective view of FIG. 6 shows a portion of another embodiment of a lane-divided modular plastic conveyor belt 30 according to the invention.

Figure 7:
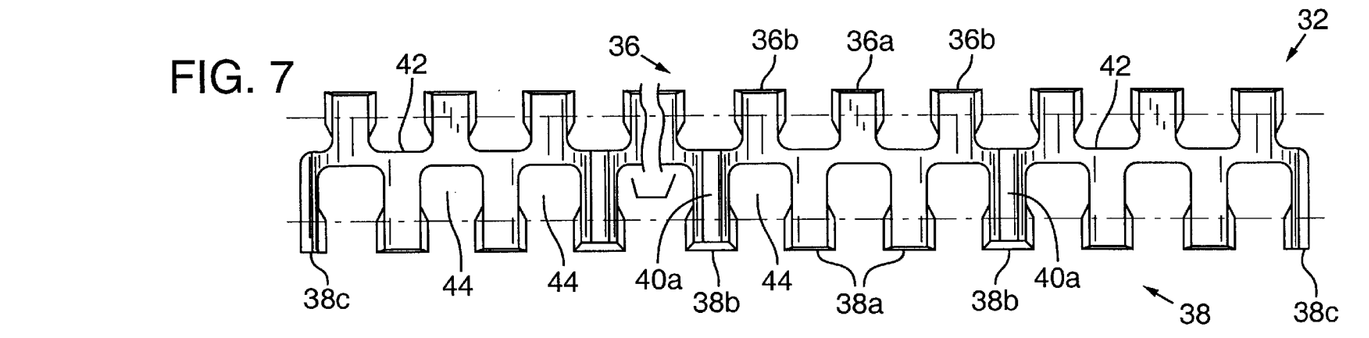
FIG. 7 is a plan view showing a module forming the belt of FIG. 6.
Figure 8:
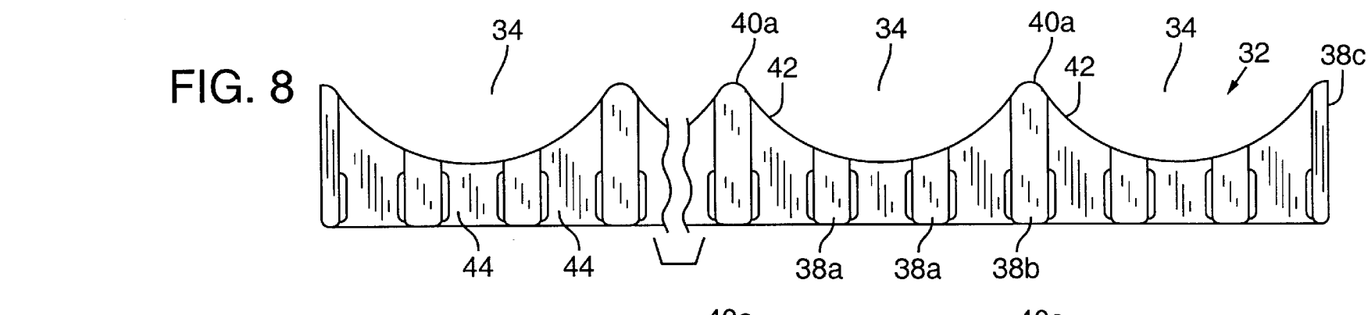
FIG. 8 is an elevation view showing a belt module as in FIG. 6, looking in one direction longitudinally relative to the belt.
Figure 9:
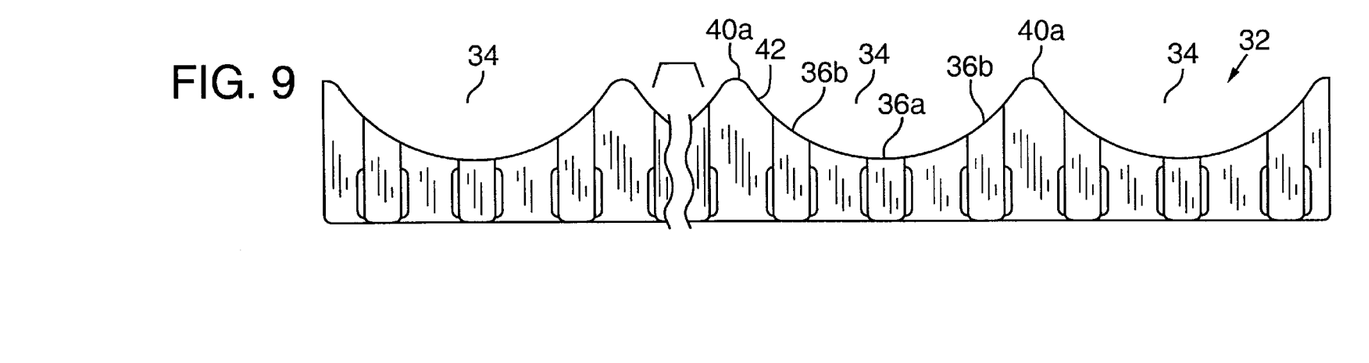
FIG. 9 is a view of the module of FIG. 6, but from the opposite longitudinal direction relative to the belt.
Figure 10:
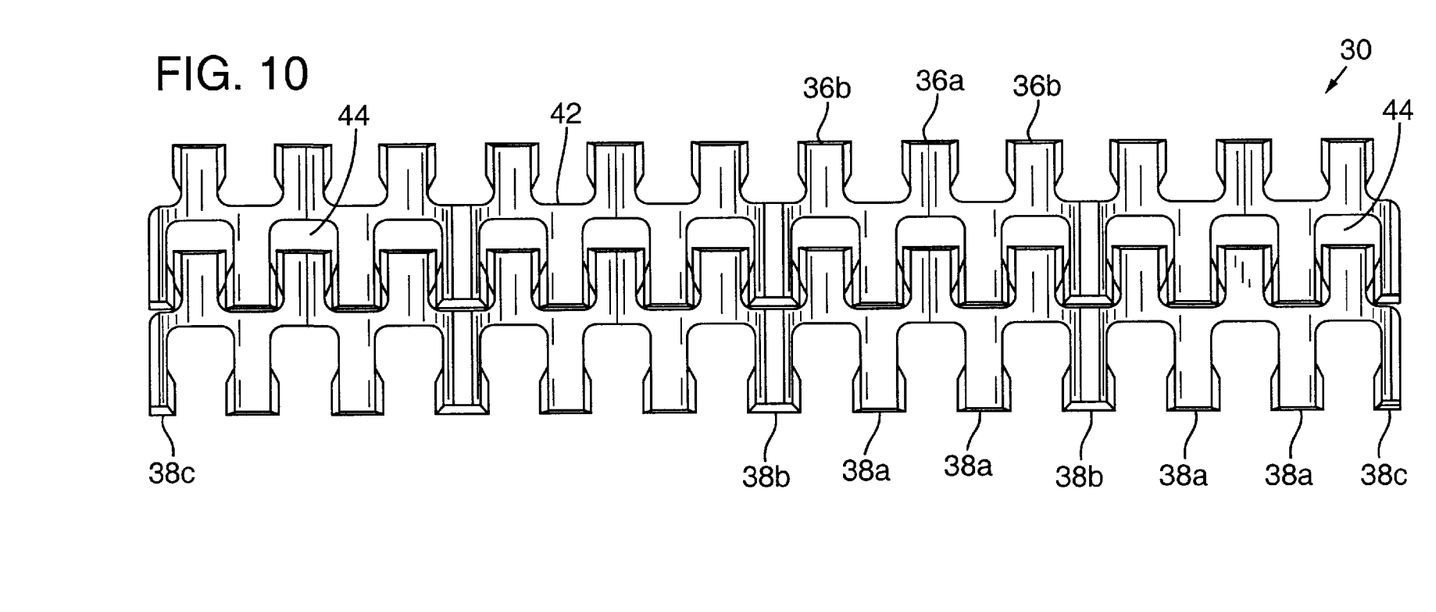
FIG. 10 is a plan view showing several interconnected modules of the belt of FIGS. 6–9.
Figure 11:
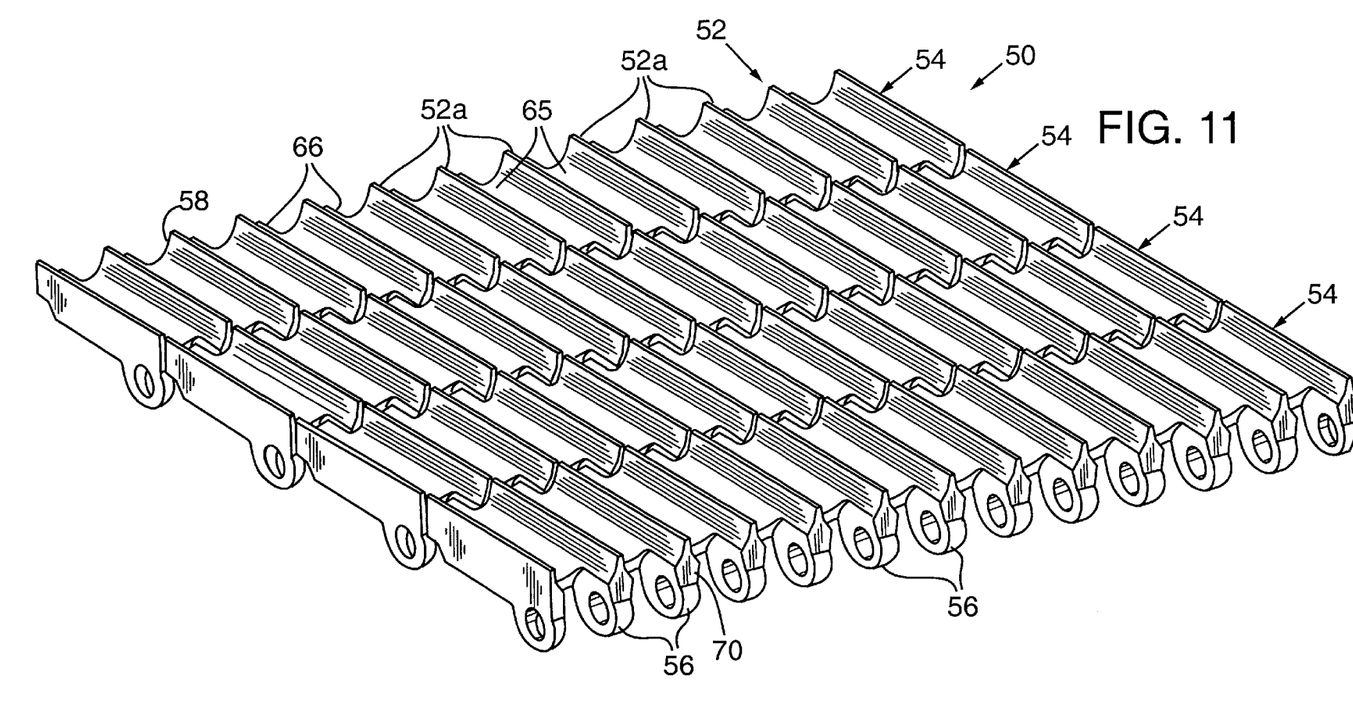
FIG. 11 is a perspective view showing a portion of a belt assembled from a modified form of modules with lane divisions on their upper sides, the modules comprising solid platforms which prevent objects from falling through the belt.
Figure 12:
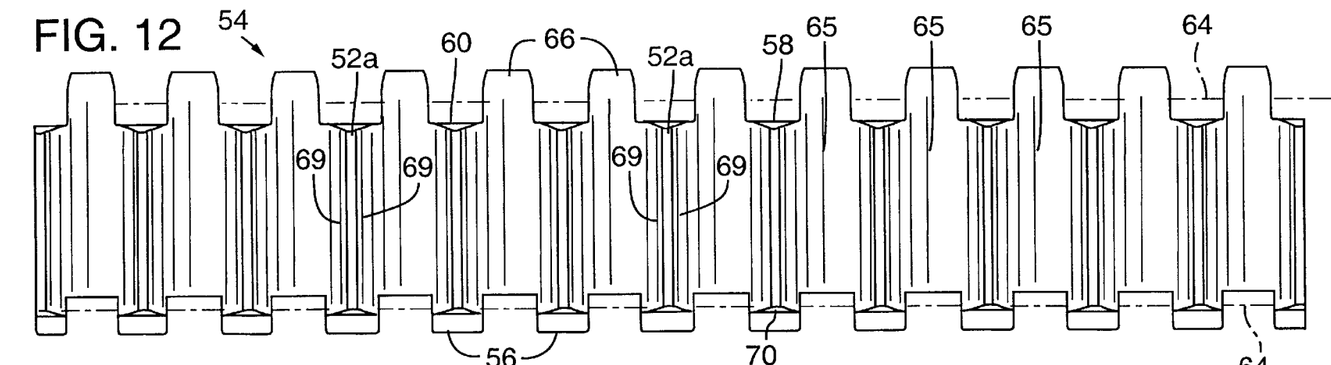
FIG. 12 is a top plan view showing a single module of the type shown in FIG. 11.

The belt 30 is made up of modules 32 which are somewhat similar to those described above but which have wider lanes 34, four being shown in a belt which may have a width of about 6 inches (152 mm), although other dimensions are possible. As above, the modules 32 have forward and rear link ends generally identified as 36 and 38. In this embodiment, more than one forward link end and more than one rear link end make up a lane. Specifically, the forward link ends comprise, at each lane, a center forward link end 36a, and a pair of side forward link ends 36b, which can better be seen in FIG. 7. The link ends 36b are opposite, mirror-image counterparts to each other. Similarly, the rear link ends 38 include two mirror-image rear link ends 38a, counterparts to each other and immediately left and right of the center forward link end 36a, and rear ridge link ends 38b which form in the connected belt an elongated ridge 40 between adjacent channels 34. These elongated ridges 40 divide the adjacent lanes, and the tops of the ridges may be wider than the ridges 22 of the embodiment described above. In one preferred embodiment the ridges 40 are about 4 to 6 mm wide, preferably with a tapering or rounded top edge 40a as shown in FIG. 8. However, the width of the ridge can be designed as a function of the products to be conveyed. Wider ridges can be tolerated for products of such shape, length, rigidity, etc., that they will not tend to be caught and remain on the tops of the ridges. In the case of cooked products to be cooled, the ridges should be narrow enough to provide the air circulation desired.

As also explained relative to the first embodiment, link ends 38c at the edges of the modules may be half-width link ends as shown, to abut with similar adjacent modules when desired, to form wider conveyor belts. Modules of lesser or greater widths can be provided, having lanes of matching widths, so that joints between modules in different rows can be staggered in position.

In the belt 30 and modules 32 shown in FIGS. 6–9, each lane is formed by the sides of two spaced apart rear ridge link ends 38b, by two intermediate rear link ends 38a, and by a center front link end 38*a* and two side front link ends 36*b*. Other numbers of link ends can be used to form a single lane, as desired, but the embodiment shown in FIGS. 6–9 generally exemplifies a lane-divided belt wherein the width of each trough-shaped lane 34 is greater than the spacing between adjacent rearward projections in a module, and such that each lane is comprised of at least two forward projections.

In the embodiment illustrated, each module may have a total of 13 rear link ends 38, including 11 normal rear link ends and 2 half-width link ends 38*c*, in a module of about 6 inches width (152 mm) and ½ inch pitch (13 mm) from module to module.

Thus, in the belt illustrated, as seen in FIGS. 6, 7, 8 and 9, each lane 34 is formed by the shoulder of a rear ridge link end 38*b*, then by the top edge of a transverse bar 42, followed by the concave top surface of one of the forward side link ends 36*b*, then by the top surface of one of the two intermediate rear link ends 38*a*, then by the top surface of the central front link end 36*a*, then by the other of the two rear intermediate link ends 38*a*, by another side front link end 36*b* and by the concave top surface of the transverse bar 42 and up to the top 40*a* of the next rear ridge link end 38*b*.

Accordingly, as in the earlier-described embodiment having a larger number of lanes through the width of the belt, the wider-lane belt 30 has lanes 34 which are formed by the top or shoulder surfaces of the forward and rear link ends themselves, without any added-on or molded-on top structure to form lanes. The structure in each module which forms lanes is interdigited with structures of connected modules. No other structure is required to form the divided lanes, the ridges 40 are substantially continuous, with minimal distance (preferably 1 to 2 mm) between them, and the lanes are interlocked by structure from adjacent modules. The belt has openings from top to bottom, particularly openings 44 at the back side of the transverse bar 42, where the belt is driven by a sprocket tooth adapted to engage between the transverse bar and the front edge of a front link end of a succeeding module.

FIGS. 11–17 show additional forms of lane-divided conveyor belts and modules according to the invention. A portion of a belt 50 is shown in perspective in FIG. 11, being a lane divided solid (not open or vented) belt, structured generally similar to the belt shown in U.S. Pat. No. 5,760,934 of KVP Systems, Inc. but with lane divisions as in the earlier embodiments herein. Such belts generally are driven at their link ends, as opposed to the above embodiments driven against the transverse connecting section.

Figure 15:
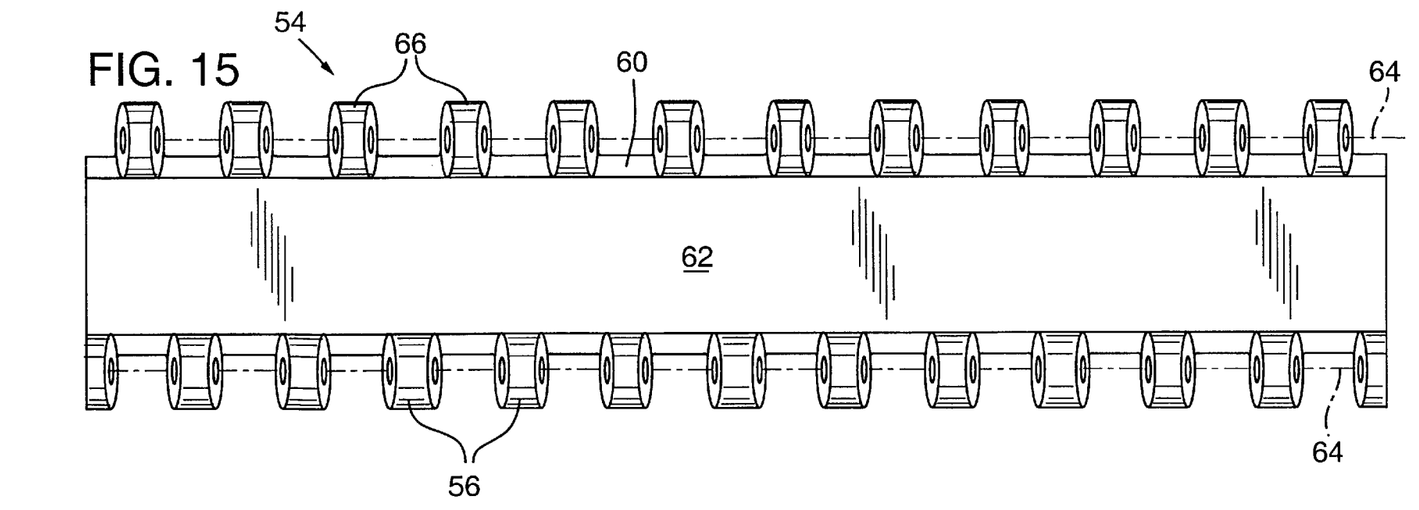
FIG. 15 is a bottom plan view of a nodule of the belt of FIG. 11.
Figure 16:
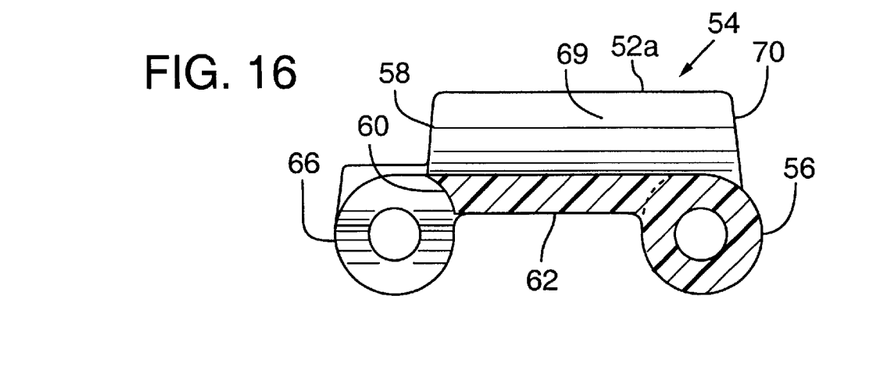
FIG. 16 is a side elevation view showing a module of FIGS. 11–15.

The belt 50 has ridges 52 formed by successive modules 54. These essentially continuous ridges are formed by individual ridges 52*a* which extend from what may be called rear projections 56 (again, the belt can he driven in either direction) longitudinally through most of the module to a forward point or face 58 at a front edge 60 of a solid deck 62 of the module of this embodiment, as seen in FIG. 16. Preferably the solid deck is at least one-half inch in length between link ends. The modules 54, in their interdigited connection, in the solid platform and, preferably, in their link end configurations providing a partially open connecting rod from beneath and increased openness as the belt bends at joints while passing over a sprocket, are similar to those described in U.S. Pat. No. 5,706,934, which is incorporated herein by reference. The belt modules of this embodiment may have virtually any pitch, e.g. about one inch (25 mm) or 2 inches (51 mm), or the pitch can be less, but in any event each module includes an expanse of platform structure 62 from pivot axis 64 to pivot axis 64, as shown in FIG. 15, as characteristic of a solid top plastic conveyor belt.

The modules 54 are integrally formed and preferably solid plastic from the bottom of the platform 62 up through the top of the ridge 52*a*.

In many respects this embodiment is similar to the embodiment described above with reference to FIGS. 1–5. The lane-dividing ridges 52*a* of each module are spaced apart at the same spacing as the rear link ends 56, although they could be configured in the manner of the embodiment of FIGS. 6–10, as well.

In the preferred embodiment shown, FIGS. 12, 13, 14 and 16 show that the ridges 52*a* and adjacent structure form a trough 65 as in the first embodiment described above, and this trough may be generally U-shaped or generally a portion of a cylinder, although other shapes can b)e incorporated as discussed earlier.

Figure 13:
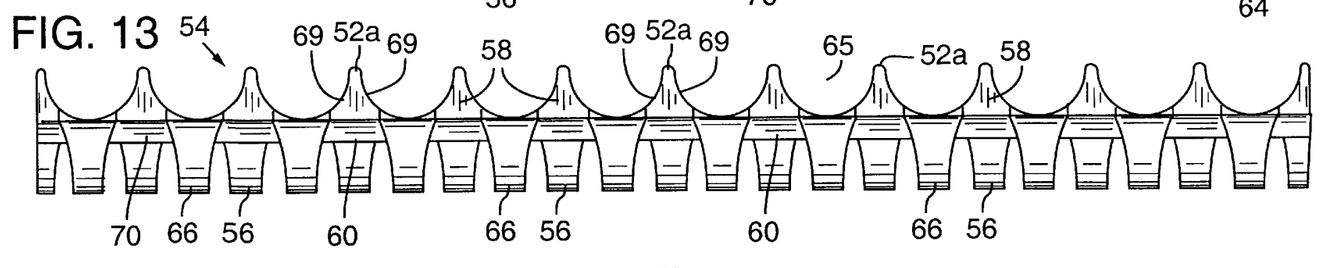
FIG. 13 is an elevation view showing a module as in FIG. 11, looking in the longitudinal direction of the belt.
Figure 14:
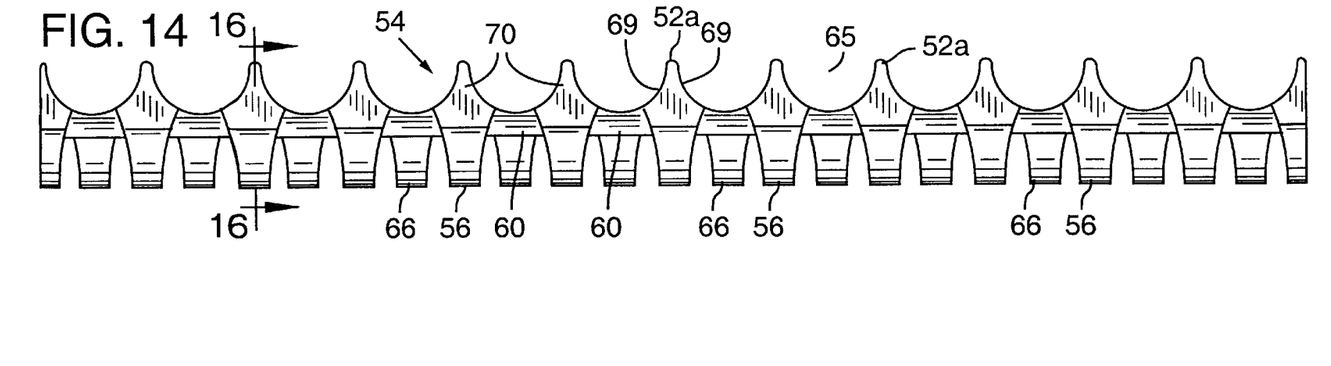
FIG. 14 is an elevation view similar to FIG. 13, but looking in an opposite longitudinal direction relative to the belt.

FIG. 13 shows what may be termed the forward link ends 66, and in the background, at the other side of the module, the rear link ends 56. The ridges 52*a* and surrounding concave channel-forming structure 69 extend from a position near the back of each rear link end 56, forward to the forward edge 60 of the solid platform 62 (see FIG. 16) of the module. As seen in both FIGS. 13 and 14, as well as FIG. 16, forward and rear faces 58 and 70 of the ridges or channel-forming structure preferably are flat, and may be angled back in each case by about 4°, as shown in FIG. 16. These faces are angled for the purpose of allowing the belt to back flex, such as when exiting from a drive sprocket or returning from rollers on a return flight. These faces may be angled back by a greater angle if desired, if the conveyed product size will allow. That is, when flat the belt should not have gaps between the ridges so large that the products can fall into or catch in the gaps.

Thus, the modules are configured such that when assembled by connecting rods along the pivot axis 64, the ridge faces 58 and 70 are essentially butted together at their lower edges, but separated slightly at the tops of the ridges 52*a* because of the slightly angled faces 58 and 70. Preferably the gap at the ridges still remains no greater than about 1 to 3 mm, but as explained above, this gap size is limited by the products to be conveyed.

Figure 17:
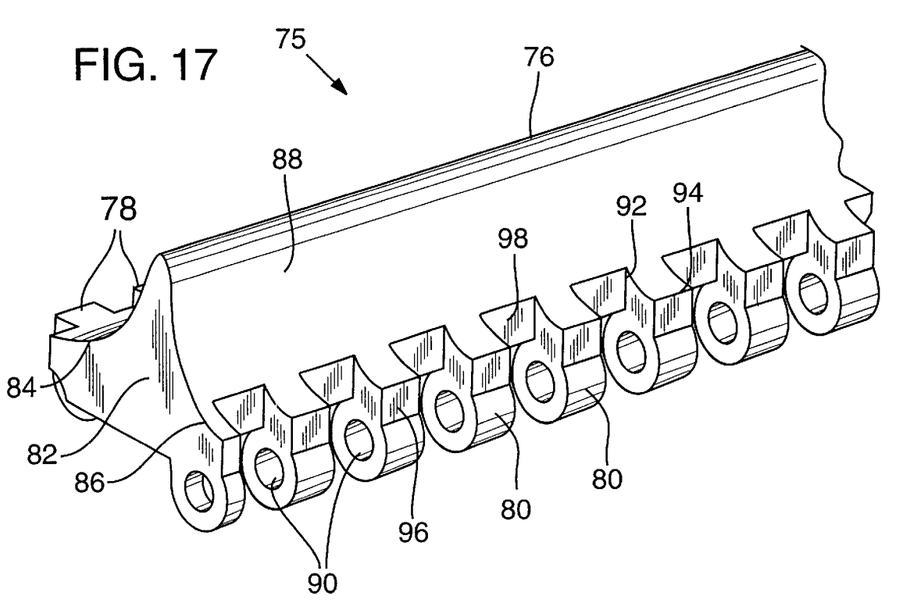
FIG. 17 is a perspective view showing a solid platform belt module which forms transverse lanes in an assembled belt.

FIG. 17 shows another embodiment of a plastic conveyor belt module 75 in accordance with the invention. The module 75 is again a solid platform module, having a substantially closed top as in the previously described embodiment, but defining transverse lanes rather than longitudinal lanes. In the embodiment illustrated, the solid module 75 has a transverse ridge 76 formed between forward link ends 78 and rear link ends 80. The link ends 78 and 80 are configured so as to be interdigited from one module to a succeeding module, and the modules in succeeding rows in a belt preferably are staggered as described above, so that joints between side-by-side modules do not lie can common lines throughout the assembled conveyor belt.

As seen in FIG. 17, the module 75 has an end 82 which may be flat, for abutting against a succeeding module or which itself can form the edge of the belt. Special edge modules (not shown) can be used at the belt edge, and these can include a barrier extending up at least along the lower portions 84 and 86 of the module, to prevent products from sliding laterally off the conveyor belt.

The edge 82 shows the general shape of the module in cross section. In this case the ridge 76 and shoulders 88 leading down to the front and rear lower areas 84 and 86 is shown with a cross section similar to some of those described above. This cross section will form a generally U-shaped trough, the bottom of which is formed where the rear link ends 80 and the front link ends 78 of a succeeding module are joined together, by a connecting rod (not shown) passing through the link end apertures 90 However, as above, the troughs can be formed in accordance with other cross sections, as desired. The bottom of the trough, assuming symmetry, is formed on the upper surfaces of the projections 78 and 80, between a base end 92 of the link end and a tip 94 of the link end, such that the upper surface of the link end is actually ascending again at its tip 94. This is true of both forward and rear link ends.

As in the solid top embodiment described above, the link ends each have faces 96 which substantially abut with faces 98 of succeeding modules, and these faces can be angled back by about 4° or another suitable angle, if desired, for back flexing of the belt. Again, these angles and the resulting gap dimensions need only be as close in tolerance as is dictated by the size of the products being conveyed.

The modules 75 are preferably formed of solid plastic, without voids and of one integral piece. The resulting transverse channel-divided belt is efficiently produced and assembled and provides a useful series of troughs or channels for many conveyor applications, without wasted space as in some prior transverse-lane or cleated belts. The embodiment 75 shown in FIG. 17 producers a single lane within a single pitch of belt, i.e. from module to module there is one transverse lane defined. However, the modules can be configured to provide two or more parallel lanes within a single pitch if desired, simply by molding the top surface of the module in a different shape. As with the longitudinal lane divided belts described above, transverse-lane belts, particularly those of smaller pitch or smaller lane-to-lane distance, can be used for cooling cooked products, which can rest on the top of the ridges 76.

A belt module similar to the module 75 shown in FIG. 17 can be formed as an open belt, rather than a solid top or closed belt, and the open belt can have a configuration generally similar to the belts of FIGS. 1–10.

The above-described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A modular plastic conveyor belt formed of interconnected modules and with an upper side divided into longitudinally extending lanes capable of receiving and conveying items generally in longitudinal rows, each module comprising:

a series of spaced forward link end projections, each having a transverse opening essentially aligned with transverse openings of other forward link end projections to receive a connecting rod therethrough for securing the module to an adjacent module, a series of spaced rearward link end projections, laterally offset from the forward link end projections of the module, the rearward link end projections having aligned transverse openings to receive a connecting rod for securing the rearward projections with forward projections of a succeeding module in interdigited relationship to secure succeeding modules together, a transverse connecting section between and integrally connected to the forward link end projections and the rearward link end projections of the module, each module having an upper side formed into a plurality of parallel lanes oriented longitudinally, each lane being generally in the shape of a trough, with a ridge as a highest feature dividing adjacent lanes, the forward link end projections each having a contoured upper surface forming a portion of the trough-shaped lane, each ridge dividing adjacent lanes being formed to encompass the top of a rearward link end projection, which also forms wall portions of the trough-shaped lane just below the ridge, whereby, when succeeding modules are interdigited, the forward link end projections interdigit with the rearward link end projections of succeeding modules to complete the trough-shaped lanes extending from module to module.

2. A modular plastic conveyor belt as in claim 1, wherein the ridges dividing adjacent lanes are about one to two millimeters in width.

3. A modular plastic conveyor belt as in claim 1, wherein the ridges dividing adjacent lanes are no more than about seven millimeters in width.

4. A modular plastic conveyor belt as in claim 1, wherein the ridges of the rearward projections of the modules in the assembled belt are closely adjacent from module to module successively, in the longitudinal direction, with small gaps between successive ridges, so that the ridges form nearly continuous longitudinally extending lane dividers.

5. A modular plastic conveyor belt as in claim 4, with a multiplicity of products carried on the conveyor belt, and wherein the small gaps between successive module ridges are sufficiently small that such products cannot fit into the gaps.

6. A modular plastic conveyor belt its in claim 1, wherein each module comprises integrally molded solid plastic material from the rear link end projections and the transverse connecting section up through the ridges.

7. A modular plastic conveyor belt as in claim 1, wherein the trough-shaped lanes are generally U-shaped, each with a concave bottom and concave walls, the forward link end projections having concave upper surfaces and the transverse connecting section and the rearward link end projections having concave upper surfaces except at the top of the ridge.

8. A modular plastic conveyor belt as in claim 7, wherein the width of each trough-shaped lane is equal to the lateral spacing between adjacent rearward link end projections in a module.

9. A modular plastic conveyor belt its in claim 7, wherein the width of each trough-shaped lane is greater than the spacing between adjacent rearward link end projections in a module, so that each lane is comprised of at least two forward link end projections in a module.

10. A modular plastic conveyor belt as in claim 1, wherein the width of each trough-shaped lane is equal to the lateral spacing between adjacent rearward link end projections in a module.

11. A modular plastic conveyor belt as in claim 1, wherein the width of each trough-shaped lane is greater than the spacing between adjacent rearward link end projections in a module, so that each lane is comprised of at least two forward link end projections in a module.

12. A modular plastic conveyor belt as in claim 11, wherein each module comprises integrally molded solid plastic material from the rear link end projections and the transverse connecting section up through the ridges.

13. A modular plastic conveyor belt is in claim 1, wherein the belt includes a series of rows of modules, each row having more than one module side by side, with successive rows of modules being staggered so that joints between adjacent side by side modules in one row are offset in position from joints of preceding and succeeding rows, and, at joints between modules, the modules having half-width rearward projections so that when held together side by side by a connecting rod, two adjacent half-width rearward link end projections butt laterally together to form generally the width of a regular rearward projection occurring between edges of a module.

14. A modular plastic conveyor belt as in claim 1, wherein each module includes a plurality of driving surfaces through the width of the module, each driving surface comprising a wall of the transverse connecting section, behind the forward link end projections, and the module defining a space between said wall and the forward end of a forward link end projection of the next succeeding module for receiving a driving tooth of a drive sprocket.

15. A modular plastic conveyor belt as in claim 1, wherein the transverse connecting section comprises a solid platform having front and rear edges which terminate at base ends of the forward and rear link end projections, and the solid platform having a length between forward and rear link end projections, in the longitudinal direction of the belt, of at least about one-half inch, the platform and link end projections being substantially closed from top to bottom.

* * * * *

UNITED STATES PATENT AND TRADEMARK OFFICE
CERTIFICATE OF CORRECTION

PATENT NO. : 6,079,543
DATED : June 27, 2000
INVENTOR(S) : Eric K. Palmaer

It is certified that error appears in the above-identified patent and that said Letters Patent is hereby corrected as shown below:

<u>Column 10,</u>
Line 33: "its" should be replaced by --as--.
Line 48: "its" should be replaced by --as--.
Line 66: "is" should be replaced by --as--.

Signed and Sealed this

Seventh Day of August, 2001

*Attest:*

*Attesting Officer*

NICHOLAS P. GODICI
*Acting Director of the United States Patent and Trademark Office*